INVENTOR.
WILLIAM H. BIXBY
BY Brown Jackson Boettcher & Dienner

INVENTOR.
WILLIAM H. BIXBY

United States Patent Office 3,376,487
Patented Apr. 2, 1968

3,376,487
CONTROL CIRCUIT FOR GRADUALLY APPLYING POWER TO A LOAD
William H. Bixby, Columbus, Ohio, assignor to North Electric Company, Galion, Ohio, a corporation of Ohio
Filed Nov. 24, 1964, Ser. No. 413,457
11 Claims. (Cl. 320—32)

ABSTRACT OF THE DISCLOSURE

A system for supplying power from an alternating current source to a direct current load having a battery connected thereacross which includes voltage control means for maintaining an essentially constant voltage to the load, current control means for limiting the load current including override means for overriding the voltage control in a current limiting operation, and walk-in circuit means operative with power startup after an outage to provide changing signals at a preset rate of change to the override means in the current control to provide a substantially ramp current to the load.

---

The present invention relates to novel means for controlling the supply of current from a source to a load, and more specifically, to novel means for effecting a controlled gradual supply of current to a load during predetermined conditions of operation.

In certain applications, as for example, in a telephone office supplied by a battery source which is in turn maintained charged by a power supply, the sudden application of current to the load may result in damage to associated exchange equipment. That is, each time the system is initially energized by closing the start switch to connect the alternating current source to the battery charger, without suitable protection (such as the novel "walk-in circuit" of the present invention), an abnormally large voltage is momentarily placed across the battery and the load, and the resultant heavy current surge in addition to being injurious to the battery may do serious damage to the load.

An unfavorable current surge condition can also arise in such system whenever the source of alternating current to the battery charger fails, since with the subsequent restoration of the current an abnormally large voltage is momentarily placed across the battery and the load, and a momentary heavy current will result across the load.

At still other times, as for example, whenever the input to the battery charger is transferred from the regular source to an alternate source, such as a motor generator set, a similar loading can occur, and without the walk-in circuit of the present invention, the motor generator set can become overloaded and slow down or stall.

Accordingly, it is an object of the present invention to provide a novel walk-in circuit for a power supply which will control the power supply circuitry to gradually pick up the load.

Another object is the provision of a circuit of such type which includes means for preparing the circuit for the walk-in mode of operation even though the source is opened only for an interval approximating one second, as for example, by the throwing of a transfer switch between a first and a second source.

It is yet another object of the invention to provide a control circuit of such type in which simple, inexpensive capacitor means are provided for effecting such manner of control.

Figure 1:
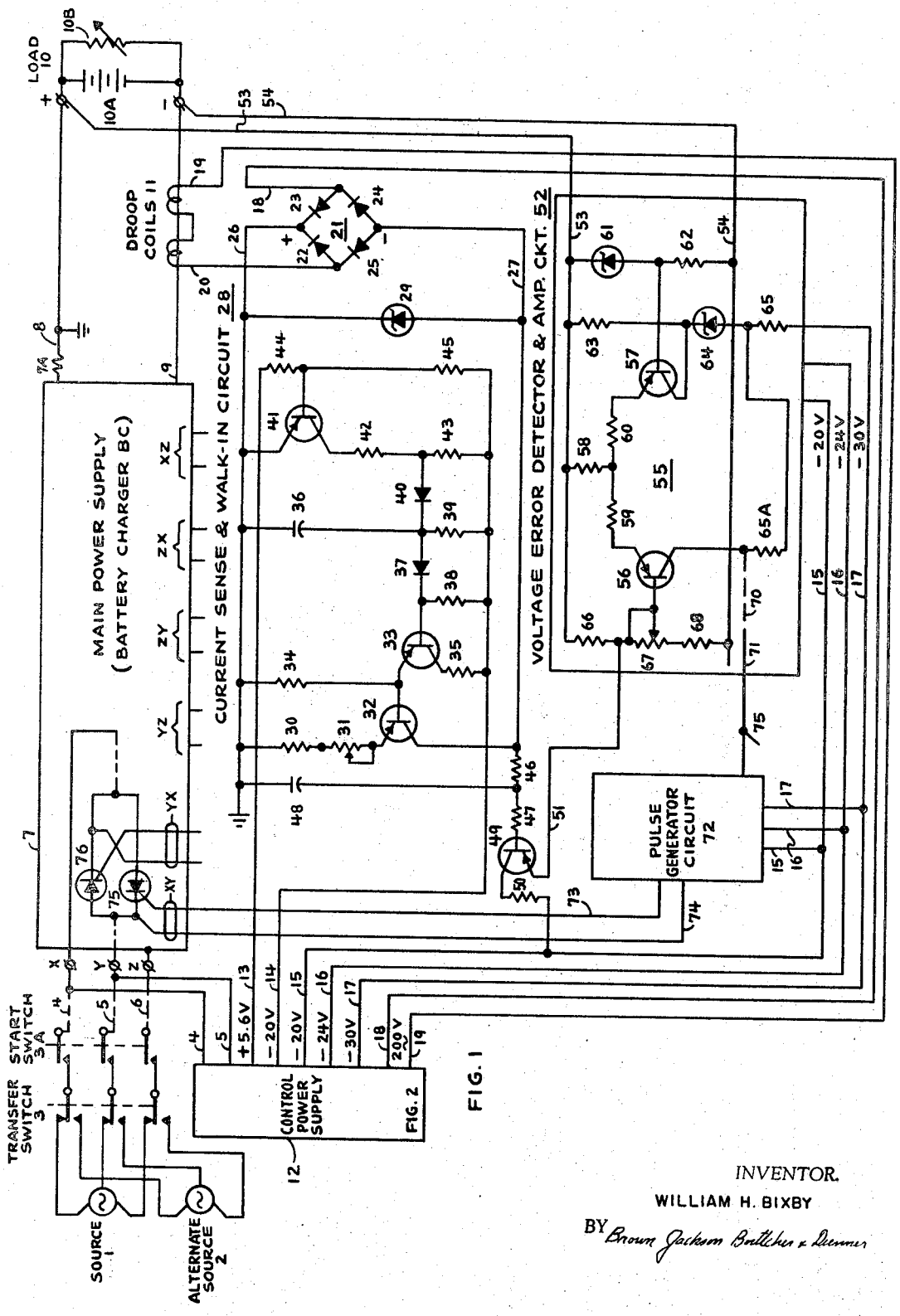
Figure 2:
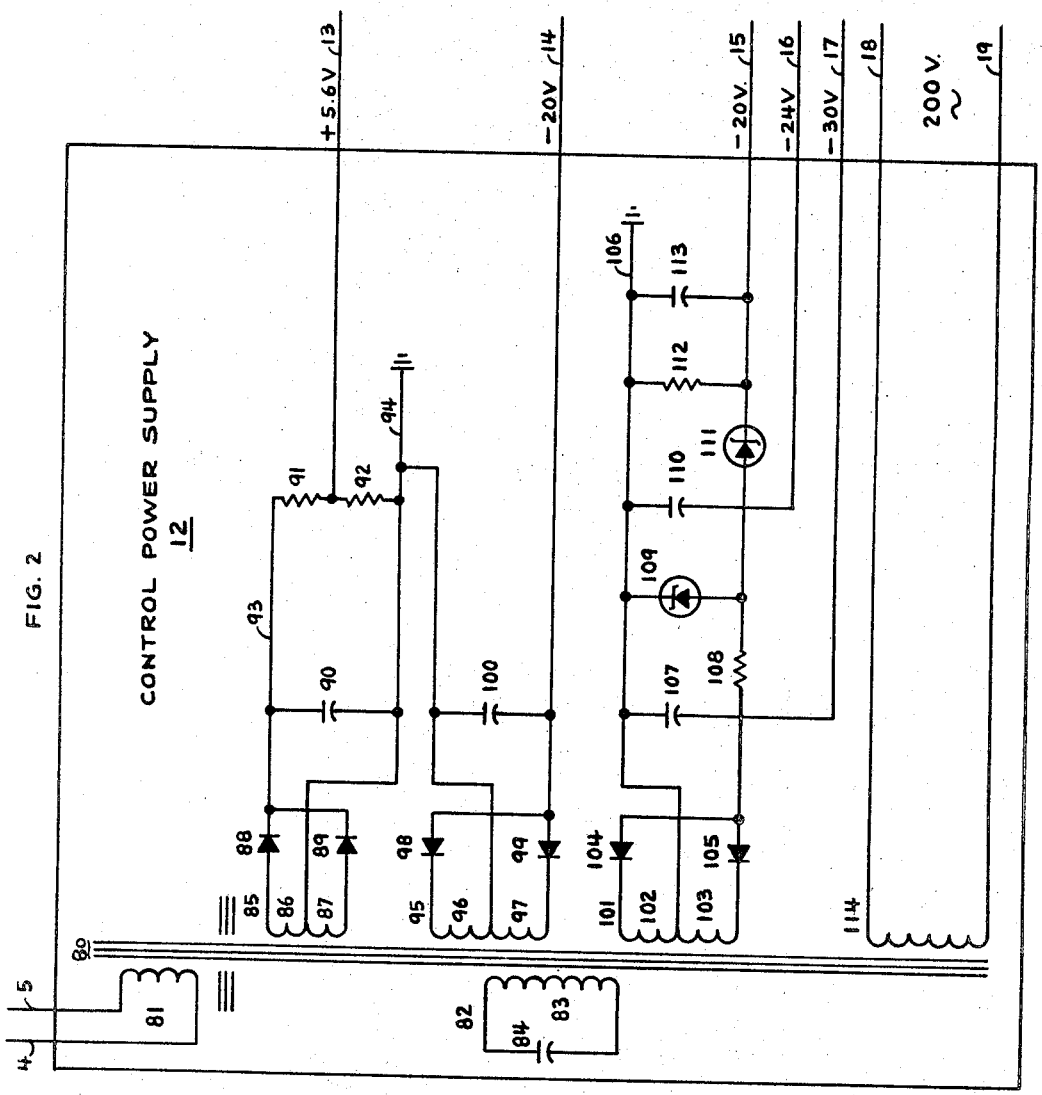
Figure 3:
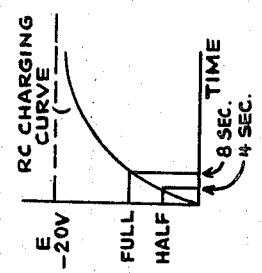

These and other objects of the invention will be apparent from the following description and accompanying drawings which serve to illustrate the various exemplary embodiments thereof in which:

FIGURE 1 illustrates the novel walk-in circuit shown as cooperating with and as a part of a circuit for controlling a silicon controlled rectifier battery charger;
FIGURE 2 illustrates the power supply for the control circuits of FIGURE 1;
FIGURE 3 is a graph of the RC charging curve of the timing condenser in the walk-in circuit with full load and half load points indicated thereon.

GENERAL DESCRIPTION

The invention may be best illustrated in its use with a known control system for a silicon controlled rectifier battery charger in a telephone exchange which includes a voltage error detector connected across the load (battery) to enable an associated control circuit in the control of the load voltage, and a current sensing circuit including droop coils which are operative to sense and control the current in the load. If the load current becomes too great, the current sensing circuitry actuates control means which override the voltage sensing control circuitry to limit the load current. One known form of control circuit for a main power supply of such type is set forth in detail in a copending application having Ser. No. 409,855, which was filed Nov. 9, 1964, and which is assigned to the assignee of this invention.

The novel walk-in circuitry of the present invention while having many other applications is conveniently disclosed in its use with the current sense droop control circuitry of such arrangement, the circuitry being operative upon failure of the source to effect rapid discharge of an associated capacitor and thereby rapidly adjusting the droop condition in preparation for subsequent reestablishment of the source. As the source is subsequently reestablished, the condenser charges slowly, taking the droop control circuitry gradually out of the droop condition, to thereby allow the battery charger to pick-up the load gradually.

In the embodiment shown herein, which is not to be considered limiting, the discharge circuit for the condenser is selected to effect discharge in approximately one second, and the charging circuit is selected to permit the charger to assume the full rated load in approximately eight seconds. As this eight second period occurs in an essentially linear portion of the RC charging curve, as will be shown, if the load is only half the full rated load, for example, the load will be picked up in approximately four seconds.

Referring now to the upper left corner of FIGURE 1, a source 1 which may be a remote commercial three phase alternating current source is shown along with an alternate source 2, which may be a local three phase motor generator set.

These sources 1 and 2 are shown as being connected via a transfer switch 3, a start switch 3A, and conductors 4, 5, 6 to the X, Y, and Z terminals of the battery charger main power supply 7. The broken line portions of conductors 4, 5, 6 indicate that the path to the main power supply 7 may include additional equipment such as a three phase auto-transformer. The broken lines in the paths from the X and Y terminals to silicon controlled rectifiers 75 and 76, for example, indicate additional equipment such as a transformer and booster transformer windings. The amount of current thus extended from the source to the load is determined by the control circuitry which normally controls selection of and the firing angle of the silicon-controlled rectifiers (two of the six in the main power supply 7 being shown) to supply current to the load in the voltage regulation mode, such manner of operation having been detailed in the above-described patent application. If the current supplied to the load increases to a predetermined point, the control circuitry controls the firing angle of the silicon controlled rectifiers to limit the current to the load. The main power supply 7 is described in patent application Ser. No. 311,053 filed Sept. 24, 1963, and is assigned to the assignee of this invention.

The direct current output of the main power source 7 is shown connected via resistance 7A which represents the internal impedance of the main power supply and grounded positive conductor 8 and via negative conductor 9 to the load 10 which may comprise a 52 volt battery, for example, connected in parallel with load 10B shown schematically for simplified illustration as a variable resistance. Current sensing droop coils 11 which are well known in the art are coupled to conductor 9; and voltage sensing conductors 53, 54 are connected across load 10.

Power conductors 4 and 5 of the XY phase input to the main power supply MPS of battery charger BC are also connected to control power supply 12 which as shown, supplies power over conductors 13 and 14 to a current sense and walk-in circuit 28 at voltages of +5.6 volts and −20 volts. The power supply also supplies power over conductors 15, 16, 17 to the control circuit CC for main power supply MPS which basically comprises voltage error detector and amplifier circuit 52 at voltages of −20 volts, −24 volts, and −30 volts. Power supply 12 also provides 200 volts alternating current potential over conductors 18 and 19 to the circuit for droop coils 11.

Conductors 53 and 54, which are connected to the positive and negative load terminals respectively, sense voltage changes in the load and couple such changes to the input side of voltage error detector and amplifier circuit 52.

The output of the voltage error detector and amplifier circuit 52 comprising a voltage error signal is conducted via conductor 71 to a pulse generator circuit 72. The marking 75 indicates that this output is multiplied to five other similar pulse generator circuits.

The output of pulse generator circuit 72 via conductors 73 and 74 controls the silicon controlled rectifier device 75 in the XY–YX phase switching means of the main power supply. Another pulse generator circuit similar to 72 controls the silicon controlled rectifier device 76 in the XY–YZ phase switching means of the main power supply. The broken lines in the circuits of the silicon controlled rectifiers indicate the other equipment such as booster transformer windings which are connected for control thereby.

Two other pulse generator circuits similar to circuit 72 control two other silicon controlled rectifier devices, not shown, which are connected to the Y and Z input terminals of 7, and two additional pulse generator circuits similar to circuit 72 control two further silicon controlled rectifier devices, not shown, which are connected to the Z and X input terminals of 7.

Generally speaking, under normal load conditions, sensing of the load voltage via conductors 53 and 54 controls operation of the voltage error detector and amplifier circuit 52 and pulse generator circuits 72 which in turn control the firing angle of the silicon controlled rectifier devices which control the booster voltage which is added to the basic voltage of the main power supply 7 so as to control the current through and thus the voltage across the load to maintain the load voltage essentially constant.

If the current to the load reaches an excessive value, the droop coil circuit via conductors 18, 19 and 20 signals the current sense means of circuit 28, and a transistor 49 via conductor 51 responsively overrides the voltage error detector and amplifier circuit 52, causing circuit 52 via the error detector lead 71 to control the pulse generator circuit, such as 72, to control the firing angle of the silicon controlled rectifiers of the main power supply to limit the current to the load.

Upon start-up, loss and reestablishment of load, or transfer of sources, the walk-in means of circuit 28 override the current-sense means, and via transistor 49 and conductor 51 control the circuits 52, 72 and 7 to allow the firing angle of the silicon controlled rectifiers to be controlled to supply current to the load in a gradually increasing amount. The manner in which these control circuits operate to achieve such manner of control is now set forth in more detail.

DETAILED DESCRIPTION

Voltage error detection

Under normal load conditions conductors 53 and 54 sense the voltage across the load 10 for the voltage error detector and amplifier circuit 52 which responsively provides signals to adjust the firing angle of the silicon controlled rectifiers in the battery charger and thereby the power output of the charger.

More specifically, the base of input transistor 57 is connected to the junction of resistor 62 and zener diode 61 which are in turn connected across the sensing conductors 53 and 54. Zener diode 61 maintains a constant reference voltage from ground to the base of transistor 57. The emitter of transistor 57 is connected over resistors 60 and 58 to the grounded positive side of the load via conductor 53 and over resistors 60 and 59 to the emitter of transistor 59. The collector of transistor 57 is connected via zener diode 64, resistor 65 and conductor 17 to the −30 volt supply; and over zener diode 61 to grounded conductor 53.

The base of transistor 56 is connected to the grounded positive side of the load through resistor 66; and to the negative side of the load over potentiometer 67 which adjusts the direct current output voltage level of the rectifier equipment, and resistor 68. The emitter of transistor 56 is connected to the grounded positive side of the load through resistors 59 and 58; and to the emitter of transistor 57 through resistors 59 and 60. Resistors 59 and 60 increase the gain stability of differential detector stage 55. The collector of transistor 56 is connected through resistors 65A and 65 and conductor 17 to the −30 volt supply. The collector of transistor 56 is also connected to associated signal generating equipment 70, shown in detail in the first-mentioned patent application, which varies the value of the signal on error signal lead 71 with changes in value of the signal input to voltage error detector 52.

If the slider of potentiometer 67 is adjusted upward, the voltage set point of battery 10A will be raised; if adjusted downward, the voltage set point will be lowered.

In operation, changes in output voltage are applied via conductors 53 and 54 to the differential amplifier 55 causing a current change at the collector of transistor 56 which reflects the change in load voltage. Thus, with a decrease in load voltage, signal circuitry 70 provides an output signal on conductor 71 to the six pulse generator circuits, such as illustrated circuit 72, to effect an increased output current from the main power supply to thereby minimize said decrease in the load voltage.

More specifically, with a drop in voltage across the load 10, the base of transistor 56 becomes less negative whereby transistor 56 conducts less current, and the collector voltage of transistor 56 becomes more negative. As a result thereof, signal generating circuitry 70 couples a signal over conductor 71 which controls the pulse generators to advance the firing angle which, in turn, causes more current to be applied to the load, thus raising the voltage by an amount which minimizes the drop in voltage.

In like manner, with an increase in load voltage the base of transistor 56 becomes more negative whereby transistor 56 conducts more current, and the collector becomes less negative, and circuit 70 provides a signal to control the pulse generators 72 to retard the firing angle, causing less current to be applied to the load, thereby reducing the load voltage to minimize the increase in voltage.

Current sense

As noted above, the current sense circuitry is activated by current sensing means to prevent excessive current flow in the load. More specifically, current sensing droop coils 11 are connected over conductor 20 to the junction of diodes 22 and 25 of the full wave rectifier 21; and over conductor 19 to the 200 volt supply of control power supply 12 (see FIGURES 1 and 2), and over conductor 18 to the junction of diodes 23 and 24 of the full wave rectifier 21.

The output of rectifier 22 which is derived at the junction of diodes 22 and 23 and the junction of diodes 24 and 25 is connected via conductor 26 to ground, and via resistors 46 and 47 to the base of transistor 49. Assuming the battery charger BC in FIGURE 1 to be a 400 ampere charger, the maximum output of rectifier 21 would be .125 ampere. Potentiometer 31 and resistor 30 are connected in series with transistor 32 across the output of rectifier 21 to provide control of the value of the output signal. Again, assuming a 400 ampere battery charger BC, resistor 30 would be 50 ohms and potentiometer 31 would be 30 ohms. With the slider of 31 at the topmost position shown in FIGURE 1, the current sense circuit would cause the output voltage to start drooping at approximately 450 amperes and to continue to droop up to approximately 470 amperes. At such point the firing control angle of the silicon controlled rectifier devices, such as 75 and 76, is at its most retarded value, whereby the booster voltage of the main power supply is reduced to zero, and the output voltage is determined by the main power supply without the booster voltage. With the slider of 31 at the lowermost position, the current sense circuit would cause the output voltage to start drooping at approximately 300 amperes and continue to droop up to approximately 320 amperes at which point the booster voltage disappears. Capacitor 48, connected between the junction of resistors 46 and 47 and ground, provides filtering for the output of rectifier 21. Zener diode 29 clamps the voltage across rectifier 21 to a maximum point well above the operating range for current sense control, and protects transistor 32 against damage from any excessive transient spikes which might occur.

The emitter of transistor 49 is connected via conductor 51 between resistor 66 and potentiometer 67 in the base circuit of transistor 56. The collector of transistor 49 is connected through current limiting resistor 50 to the —20 volt supply conductor 15.

Condenser 36 is normally charged to —20 volts over the path from ground, conductor 26, condenser 36, rectifier 37, and resistor 38 (in parallel with resistor 39) to the —20 volt conductor 14.

Transistor 33 has its emitter connected through 2K resistor 34 to ground and to the base of transistor 32; and its collector connected over the 360 ohm resistor 35 to the —20 volt conductor 14.

Transistor 32 has its emitter connected through potentiometer 31 and resistor 30 to ground; and its collector connected to the negative direct current output of rectifier 21.

With condenser 36 charged, diode 37 is back-biased and transistors 33 and 32 are in saturation, placing transistor 49 under control of resistor 30 and potentiometer 31 of the current sense-circuit.

When the load current increases, the direct current magnetic field in the current sensing coils 11 also increases. The current sensing coils 11 are excited by the 200 volt alternating current signal over conductors 18 and 19 in series with the full wave rectifier 21. An ampere-turn balance is maintained between the direct current ampere-turns in the primary or load bus and the alternating current ampere-turns in the secondary coils 11. That is, the peak value of alternating current in coils 11 is proportioned to the direct current in the load.

If the load current increases, the alternating current in coils 11 also increases. The alternating current is rectified by the full wave rectifier 21 and passes through resistor 30, potentiometer 31 and the emitter-collector path of transistor 32. Therefore, with transistor 32, in saturation, the direct current voltage across 30 and 31 is essentially proportional to the direct load current. If the load current is below a predetermined value, the potential across 30 and 31 is at a value such that transistor 49 is cut-off or nonconducting, whereby transistor 49 allows the voltage sensing circuit 52 to function to keep the voltage of the load essentially constant.

If the load current increases above the predetermined maximum value as determined by the setting of potentiometer 31, the voltage across 30 and 31 becomes larger than the voltage across resistor 66, and transistor 49 conducts current and operates as an emitter follower.

With transistor 49 conducting and operating as an emitter follower, as the base of transistor 49 becomes more negative, the emitter which is close to the base in potential becomes more negative in turn causing the junction point of resistors 66 and 67 first to resist the tendency of voltage error detector to make it become more positive thus causing the voltage of the main power supply to level off whereupon any reduced impedance of the load causes a slight increase of current therethrough and decreased voltage thereacross. As the emitter of transistor 49 becomes more negative it causes the junction point of resistors 66 and 67 to become more negative to thereby cause the base of transistor 56 to become increasingly more negative. With the resultant increasing conductivity of transistor 56, the collector thereof becomes increasingly less negative, causing control circuitry 70 to signal the pulse generators, such as 72, to increasingly retard the firing angle and thereby progressively reduce the voltage of 7 whereby current from the main power supply through the load is limited.

As the load current decreases, the droop coils 11 sense the decreased current across the load, and by a similar process (in reverse) the circuit moves out of the droop condition and restores control to the voltage sense circuit.

Operation of walk-in circuit

The manner in which the walk-in circuit is operative to provide a gradual increase in current after loss of power is now set forth in several examples. Assuming initially that the input source, such as source 1, is lost, the XY phase to control circuit 12 disappears.

With reference next to the control power supply 12 of FIGURE 2, the control power supply 12 includes a ferro-resonant transformer 80 having a primary 81, a ferro-resonant secondary 82, and three power secondaries 85, 95, and 101. Condensers 90 and 100 connected across secondaries 85 and 95 respectively have 500 and 1000 m.f.d. values respectively. The RC circuit constants of the supply circuit which extends +5.6 volt supply over conductor 13 and the supply circuit which extends —20 volt over conductor 14 are such that the —20 volt potential on conductor 14 persists longer than the +5.6 volt potential on conductor 13.

Referring back to FIGURE 1, the more rapid decay of the +5.6 volt potential on conductor 13 which normally biased transistor 41 off, allows the base of transistor 41 which is connected through resistor 45 to the —20 volt conductor 14 to rapidly become very much more negative than the emitter which is connected to ground. The collector of transistor 41 is connected as shown through resistors 42 and 43 to conductor 14. Accordingly transistor 41 rapidly turns on full, providing a path for condenser 36 to discharge from the upper plate thereof over conductor 26, the emitter-collector path of transistor 41, resistor 42 and diode 40 in the forward direction, to the lower plate of 36. The time constants are such that condenser 36 discharges in approximately one second.

When input potential reappears at the X, Y, Z terminals, the control power supply 12 is again energized and provides the indicated potentials on conductors 13–19.

The application of +5.6 volts potential on conductor 13 causes transistor 41 to be cut off and the charging circuit for capacitor 36 to be reestablished. The lower plate of capacitor 36 being at about ground potential causes the base of transistor 33 to be less negative than the emitter, keeping transistor 33 cutoff with the emitter thereof close to ground potential.

As a result the base of transistor 32 is maintained close to ground potential and transistor 32 is cut-off. With transistor 32 cut-off, the base of transistor 49 becomes much more negative than the emitter, turning transistor 49 full on, in turn turning transistor 56 full on which via circuitry 70, 72, and 7 retards the firing angle to the limit for droop operation with the voltage of 7 at a minimum with minimum current from 7 through the load.

As condenser 36 charges, the base of transistor 33 becomes more and more negative causing transistor 33 to conduct increasingly, in turn causing transistor 32 to conduct increasingly. As the lower plate of conductor 36 becomes more negative diode 37 becomes back-biased and condenser 35 continues to charge through resistor 39 (see FIGURE 3).

If the current determined by the load impedance is less than the set point determined by potentiometer 31, when this value of current through the load is reached, transistors 33 and 32 will be saturated, causing transistor 49 to be cut-off, taking the circuit of the droop condition.

With circuit constants shown, if the current through the load is equal to the set point (i.e. full rated current), it will take not less than eight seconds for the charger to come out of the droop condition, picking up full load (see FIGURE 3). If the current determined by the load impedance is only half that of the set point, the circuit will pick up this load in four seconds ( see FIGURE 3).

SPECIFIC ILLUSTRATIVE VALUES

Components for one embodiment of a control circuit for a 400 amp charger and a 52 volt battery connected as shown in FIGURE 1 were as follows:

| Designation | Line | Values or Identifications |
|---|---|---|
| 22–25 | Diodes | 1N1222. |
| 29 | Zener Diode | 1N2976-B. |
| 30 | Resistor | 50 ohms. |
| 31 | Potentiometer | 30 ohms. |
| 32 | Transistor | 2N2140. |
| 33 | Transistor | 2N527. |
| 34 | Resistor | 2K. |
| 35 | do | 360 ohms. |
| 36 | Condenser | 1,800 mfd. |
| 37 | Diode | 1N1217. |
| 38 | Resistor | 10K. |
| 39 | do | 40K. |
| 40 | Diode | 1N1217. |
| 41 | Transistor | 2N527. |
| 42 | Resistor | 200 ohms. |
| 43 | do | 10K. |
| 44 | do | 2K. |
| 45 | do | 8K. |
| 46 | do | 510 ohms. |
| 47 | do | 510 ohms. |
| 48 | Condenser | 20 mfd. |
| 49 | Transistor | 2N527. |
| 50 | Resistor | 820 ohms. |
| 56 | Transistor | 2N527. |
| 57 | do | 2N527. |
| 58 | Resistor | 1.9k. |
| 59 | do | 30 ohms. |
| 60 | do | 30 ohms. |
| 61 | Zener Diode | 1N621. |
| 62 | Resistor | 4K. |
| 63 | do | 1K. |
| 64 | Zener Diode | 1N750A. |
| 65 | Resistor | 150 ohms. |
| 65A | do | 200 ohms. |
| 66 | do | 250 ohms. |
| 67 | do | 200 ohms. |
| 68 | do | 1K. |
| 80 | North Electric Co. Ferroresonant Transformer. | 6123626. |
| 88 | Rectifier | 1N1217. |
| 89 | do | 1N1217. |
| 90 | Condenser | 500 mfd. |
| 91 | Resistor | 180 ohms. |
| 92 | do | 120 ohms. |
| 98 | do | 1N1218. |
| 99 | do | 1N1218. |
| 100 | Condenser | 1,000 mfd. |
| 104 | Rectifier | 1N1218. |
| 105 | do | 1N1218. |
| 107 | Condenser | 2,500 mfd. |
| 108 | Resistor | 50 ohms. |
| 109 | Zener Diode | 10M2425 (1N2986B). |
| 110 | Condenser | 50 mfd. |
| 111 | Zener Diode | 1M29A25 (1N3823A). |
| 112 | Resistor | 1K. |
| 113 | Condenser | 50 mfd. |

In an alternative embodiment, transistor 41 and resistors 42, 43, 44 and 45 can be omitted, diode 40 can be connected directly to conductor 14, and a 400 ohm resistor can be connected across condenser 100 in FIGURE 2, in which event the discharge path for condenser 36 can be extended over this resistor to ground in the control power supply of FIGURE 2. In this case discharge of condenser 36 will occur in about four and one-half seconds. The +5.6 v. supply is not required. Accordingly, in cases not requiring rapid discharge, a saving in components is thus possible.

It will be understood that the invention is not limited to the particular embodiments thereof disclosed herein, since many modifications of and changes in the disclosed structure may be made in accordance with the inventive concept without departing from the scope thereof. It is therefore not intended that the invention be limited otherwise than as required by the appended claims.

What is claimed is:

1. In a system for supplying power from an alternating current source to a direct current load, power supply means connected between said source and said load, power supply control means for controlling current flow over said power supply means, voltage sensing means for sensing the voltage across said load, a first variable impedace means controlled by said voltage sensing means for enabling said power supply control means to maintain an essentially constant voltage across said load; current control means including means for determining current flow of a predetermined value from said power supply means to said load, and a second variable impedance means for overriding the control by said voltage sensing means and controlling said first variable impedance means to effect limiting of the current to the load in response to current flow of said predetermined value, and walk-in circuit means comprising means operative in response to initial power startup to provide a changing signal to said second variable impedance means at a preset rate which effects a gradual increase of current from said power supply means to said load.

2. In a system for supplying power from an alternating current source to a load circuit which includes a direct current load having a potential source connected thereacross, power supply means connected between said source and said load circuit, control means for said power supply means, voltage control means for operating said control means and said power supply means in a normal voltage regulation mode, current control means including means for providing an indication of a predetermined value of current flow from said power supply to said load circuit, and variable impedance means controlled in response to said predetermined current flow to override and control said voltage means, said control means and said power supply means to effect limitation of current to said load circuit, and walk-in circuit means operative with loss and subsequent re-establishment of said alternating current source to enable said variable impedance means in said current control means to provide changing signals at a given rate to said voltage control means to thereby effect a slowly increasing current to said load.

3. A system as set forth in claim 2 in which said power supply means include controlled rectifiers, and said control means for said power supply means is operative to effect variation of the time of conduction of said controlled rectifiers in a cycle to vary the current to said load circuit.

4. A system as set forth in claim 2 in which said power supply means include booster means, and controlled rectifier means for controlling transfer of power from said source over said booster means to said load circuit, and in which said control means for said power supply controls the period of conduction by said controlled rectifiers in each cycle.

5. In a system for supplying power from an alternating current source to a load circuit including a direct current load and battery connected thereacross, power supply means connected between said source and said load circuit, first control means operative to enable said power supply means to maintain an essentially constant voltage across the load, current control means for determining current flow of a predetermined value from said power supply to said load including override means for enabling said first control means to effect a current limiting action by said power supply means, and walk-in circuit means comprising capacitor means, a charging circuit for charging said capacitor means at a slow rate connected to maintain said capacitor charged with said power supply source in the normal voltage regulation mode, loss-of-source responsive means operative in response to interruption of said alternating current source to enable a discharge circuit to discharge said capacitor at a fast rate, and means in said current control means controlled by said charging circuit to provide changing value signals to said override means at a predetermined rate of change to thereby provide a gradually increasing current from said main power supply to said load.

6. A circuit as set forth in claim 5 in which said means for completing a discharge circuit for said capacitor means comprises a transistor device connected to establish a discharge path for said capacitor, and control means normally operative to maintain said transistor turned off, and operative to turn said transistor on with loss of said source.

7. A circuit as set forth in claim 5 in which said means for completing a discharge circuit includes a transistor device including a first and second element, and which includes potential supply means for supplying power over one path to said first element, and over a second path to said second element to normally maintain said transistor cut-off, and means for interrupting the power over one path prior to interruption of the power over the second path to effect rapid turn-on of said transistor with loss of said source.

8. In a power supply circuit for supplying current from an alternating current source to a direct current load including a main power supply, first control means for controlling the main power supply to compensate for load voltage changes to maintain an essentially constant voltage across the load, second control means including means for sensing the current from said main power supply to the load, and first variable impedance means in said second control means controlled with sensing of current in excess of a predetermined value from said main power supply to said load to override and control said first control means to limit the current from said main power supply to said load, and third control means comprising capacitor means, a charging circuit for maintaining said capacitor means charged with said main power supply operated in the normal voltage regulation mode, switching means operative with interruption of said alternating current source to complete a circuit to discharge said capacitor means at a fast rate, second variable impedance means in said second control means placed in a high impedance state responsive to said capacitor discharge, said switching means being operative with reestablishment of said source to reestablish said charging circuit to gradually reduce the impedance of said second variable impedance means, said capacitor continuing to charge after said second variable impedance means has been placed in its lowest impedance state.

9. A power supply circuit as set forth in claim 8 in which said second variable impedance means is responsive to loss and reestablishment of the alternating current source to control said first variable impedance means to control said first control means to effect a gradual increasing current from the main power supply to the load in picking up the load.

10. In a system for supplying power from an alternating current source to a load circuit including a direct current load and battery connected thereacross, power supply means including impedance means for controlling the flow of current to said load circuit, current control means including current sensing means coupled to said load circuit for sensing current flow of a predetermined value from said power supply means to said load circuit, further control means controlled by said current control means to enable said impedance means to limit the current flow from said power supply means to the load circuit, and walk-in circuit means operative with loss, and subsequent re-establishment, of said alternating current source to enable said current control means and thereby said further control means and said impedance means, to provide a substantially ramp function current from said power supply to said direct circuit load having said battery connected thereacross.

11. A system as set forth in claim 10 in which said walk-in circuit means comprises capacitor means, a charging circuit for charging said capacitor means at a slow rate connected to maintain said capacitor means charged with said power supply source in the normal voltage regulation mode, and loss-of-source responsive means operative in response to interruption of said alternating current source to enable a discharge circuit to discharge said capacitor means at a fast rate, and which includes means in said current control means controlled by said charging circuit to provide changing value signals to said further control means at a predetermined rate of change to thereby provide a gradually increasing current from said main power supply to said load.

References Cited

UNITED STATES PATENTS

| | | | |
|---|---|---|---|
| 3,013,199 | 12/1961 | Hollingsworth et al. | 321—19 |
| 3,173,078 | 3/1965 | Farnsworth | 323—9 |
| 3,243,689 | 3/1966 | Perrins | 321—18 |
| 3,267,350 | 8/1966 | Graham et al. | 323—9 |
| 3,283,238 | 11/1966 | Huge et al. | 323—9 |

JOHN F. COUCH, *Primary Examiner.*

M. L. WACHTELL, W. H. BEHA, Jr.,
*Assistant Examiners.*